(12) United States Patent
Han et al.

(10) Patent No.: US 11,527,363 B2
(45) Date of Patent: Dec. 13, 2022

(54) MULTILAYER CERAMIC ELECTRONIC COMPONENT

(71) Applicant: SAMSUNG ELECTRO-MECHANICS CO., LTD., Suwon-si (KR)

(72) Inventors: Yu Bi Han, Suwon-si (KR); Chae Min Park, Suwon-si (KR); Woo Chul Shin, Suwon-si (KR); Ji Hee Moon, Suwon-si (KR); Ji Hea Kim, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 5 days.

(21) Appl. No.: 17/012,200

(22) Filed: Sep. 4, 2020

(65) Prior Publication Data
US 2021/0090810 A1    Mar. 25, 2021

(30) Foreign Application Priority Data
Sep. 23, 2019   (KR) .......................... 10-2019-0116581

(51) Int. Cl.
*H01G 4/248*     (2006.01)
*H01G 4/30*      (2006.01)
*H01G 4/12*      (2006.01)

(52) U.S. Cl.
CPC .............. *H01G 4/30* (2013.01); *H01G 4/1227* (2013.01); *H01G 4/248* (2013.01)

(58) Field of Classification Search
None
See application file for complete search history.

(56) References Cited

U.S. PATENT DOCUMENTS

| | | | | |
|---|---|---|---|---|
| 8,570,711 | B2* | 10/2013 | Seo | H01G 4/012 361/321.2 |
| 10,032,559 | B2* | 7/2018 | Ando | H01G 4/30 |

(Continued)

FOREIGN PATENT DOCUMENTS

| | | |
|---|---|---|
| CN | 102969155 A | 3/2013 |
| CN | 104576045 A | 4/2015 |

(Continued)

OTHER PUBLICATIONS

Office Action issued in corresponding Chinese Patent Application No. 202011001213.8 dated Jul. 27, 2022, with English translation.

*Primary Examiner* — Dion R. Ferguson

(74) *Attorney, Agent, or Firm* — Morgan, Lewis & Bockius LLP

(57) ABSTRACT

A multilayer ceramic electronic component includes a ceramic body having first and second surfaces opposing each other in a first direction, third and fourth surfaces opposing each other in a second direction, and fifth and sixth surfaces opposing each other in a third direction; and an external electrode disposed on one of the third and fourth surfaces and extending onto the first and second surfaces of. A relational expression of $0.9 \leq A/BW < 1.0$ is satisfied, where a shortest distance, in the second direction, from an end portion of the ceramic body which the external electrode is disposed at to an end portion of the external electrode disposed on one of the first and second surfaces, is denoted by "A", and a longest distance, in the second direction, from the end portion of the ceramic body to the end portion of the external electrode, is denoted by "BW".

20 Claims, 5 Drawing Sheets

(56) References Cited

U.S. PATENT DOCUMENTS

| | | | |
|---|---|---|---|
| 10,068,709 B2* | 9/2018 | Miyazaki | H01G 4/0085 |
| 10,600,571 B1* | 3/2020 | Moon | H01G 2/02 |
| 11,081,281 B2* | 8/2021 | Lee | H01G 4/232 |
| 2003/0041427 A1* | 3/2003 | Hattori | H01G 4/30 29/25.42 |
| 2006/0126264 A1* | 6/2006 | Yoshii | H01G 4/30 361/301.1 |
| 2010/0091429 A1* | 4/2010 | Koga | H01G 4/30 361/321.2 |
| 2011/0007449 A1 | 1/2011 | Seo et al. | |
| 2013/0050894 A1* | 2/2013 | Ahn | H01G 4/30 361/306.3 |
| 2013/0050898 A1* | 2/2013 | Seo | H01G 4/30 361/321.2 |
| 2015/0077898 A1* | 3/2015 | Chung | H01G 4/232 361/301.4 |
| 2015/0114703 A1 | 4/2015 | Shimizu | |
| 2016/0042864 A1* | 2/2016 | Hong | H01G 4/30 361/301.4 |
| 2016/0099106 A1* | 4/2016 | Kurokawa | H01F 27/2804 361/301.4 |
| 2017/0011852 A1 | 1/2017 | Miyazaki | |
| 2017/0186538 A1* | 6/2017 | Ando | H01G 4/30 |
| 2017/0345572 A1 | 11/2017 | Sasaki et al. | |
| 2021/0090810 A1* | 3/2021 | Han | H01G 4/012 |

FOREIGN PATENT DOCUMENTS

| | | |
|---|---|---|
| JP | 2011-18874 A | 1/2011 |
| JP | 2014-220324 A | 11/2014 |
| KR | 10-2013-0023612 A | 3/2013 |

* cited by examiner

I – I'

MULTILAYER CERAMIC ELECTRONIC COMPONENT

CROSS-REFERENCE TO RELATED APPLICATION(S)

This application claims the benefit of priority to Korean Patent Application No. 10-2019-0116581 filed on Sep. 23, 2019, in the Korean Intellectual Property Office, the disclosure of which is incorporated herein by reference in its entirety.

TECHNICAL FIELD

The present disclosure relates to a multilayer ceramic electronic component, more specifically to a multilayer ceramic electronic component having excellent reliability.

BACKGROUND

Along with the recent miniaturization, slimming, and multifunctionalization of electronic products, chip components thereof are also required to be miniaturized, and the mountings of electronic components have also become highly integrated.

A multilayer ceramic capacitor, one type of electronic components, is mounted on the circuit boards of various electronic products such as a display device, for example, a liquid crystal display (LCD), a plasma display panel (PDP), or the like, a computer, a personal digital assistant (PDA), a mobile phone, and the like, serving to charge and discharge electricity.

Such a multilayer ceramic capacitor may be used as a component of various electronic devices due to advantages thereof, such as small size, high capacitance, and ease of mounting.

Meanwhile, as industry interest in electrical components has recently increased, multilayer ceramic capacitors have also been required to have high reliability and high strength characteristics in order to be used in an automobile or infotainment system.

In particular, as high flexural strength characteristics are required for multilayer ceramic capacitors, an improvement is required in internal and external structures for improving flexural characteristics.

SUMMARY

An aspect of the present disclosure is to provide a multilayer ceramic electronic component, more specifically, a multilayer ceramic electronic component having improved reliability.

According to an aspect of the present disclosure, a multilayer ceramic electronic component includes a ceramic body including a dielectric layer and a plurality of internal electrodes disposed to oppose each other with the dielectric layer interposed therebetween, and having first and second surfaces opposing each other in a first direction, third and fourth surfaces connected to the first and second surfaces opposing each other in a second direction, and fifth and sixth surfaces connected to the first to fourth surfaces and opposing each other in a third direction; and an external electrode disposed on one of the third and fourth surfaces opposing each other in the second direction and connected to internal electrodes among the plurality of internal electrodes exposed from the one of the third and fourth surfaces. The external electrode extends onto the first and second surfaces of the ceramic body. A relational expression of $0.9 \leq A/BW < 1.0$ is satisfied, where a shortest distance, in the second direction, from an end portion of the ceramic body which the external electrode is disposed at to an end portion of the external electrode disposed on one of the first and second surfaces of the ceramic body, is denoted by "A", and a longest distance, in the second direction, from the end portion of the ceramic body which the external electrode is disposed at to the end portion of the external electrode disposed on the one of the first and second surfaces of the ceramic body, is denoted by "BW".

According to an aspect of the present disclosure, a multilayer ceramic electronic component includes a ceramic body including a dielectric layer and a plurality of internal electrodes disposed to oppose each other with the dielectric layer interposed therebetween, and having first and second surfaces opposing each other in a first direction, third and fourth surfaces connected to the first and second surfaces opposing each other in a second direction, and fifth and sixth surfaces connected to the first to fourth surfaces and opposing each other in a third direction; and an external electrode disposed on one of the third and fourth surfaces and connected to internal electrodes among the plurality of internal electrodes exposed from the one of the third and fourth surfaces. The external electrode extends onto the first and second surfaces of the ceramic body. A ratio BW/L satisfies $0.2 \leq BW/L \leq 0.3$, where a longest distance, in the second direction, from an end portion of the ceramic body which the external electrode is disposed at to an end portion of the external electrode disposed on one of the first and second surfaces of the ceramic body, is denoted by "BW", and a length of the ceramic body is denoted by "L". A length, in the second direction, of a center portion of an extension portion of the external electrode on the one of the first and second surfaces, is less than a length, in the second direction, of an edge portion of the extension portion of the external electrode on the one of the first and second surfaces.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
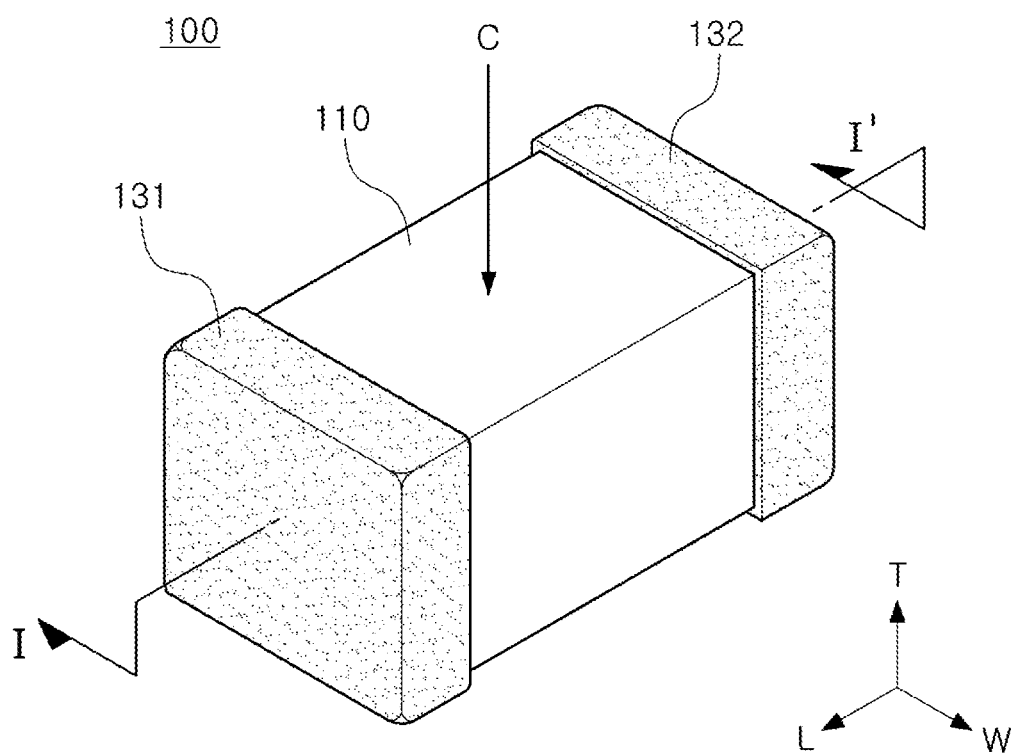
FIG. 1 is a perspective view illustrating a multilayer ceramic electronic component according to an exemplary embodiment of the present disclosure.

The present disclosure may be embodied in many different forms and should not be construed as being limited to the embodiments set forth herein. Rather, these embodiments are provided so that this disclosure will be thorough and complete, and will fully convey the scope of the invention to those skilled in the art. Accordingly, in the drawings, the shapes and dimensions of elements may be exaggerated for clarity, and the same reference numerals will be used throughout to designate the same or like elements.

Through the specification, in addition, unless explicitly described to the contrary, the word "comprise" and variations such as "comprises" or "comprising," will be understood to imply the inclusion of stated elements but not the exclusion of any other elements.

In order to clarify the present invention, parts irrespective of description will be omitted, and in order to clearly express several layers and regions, thicknesses are exaggerated, and similar reference numerals are used for similar parts throughout the specification.

A value used to describe a parameter such as a 1-D dimension of an element including, but not limited to, "length," "width," "thickness," "diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

Hereinafter, preferred embodiments of the present disclosure will be described with reference to the attached drawings.

FIG. 1 is a perspective view illustrating a multilayer ceramic electronic component according to an exemplary embodiment of the present disclosure.

Figure 2:
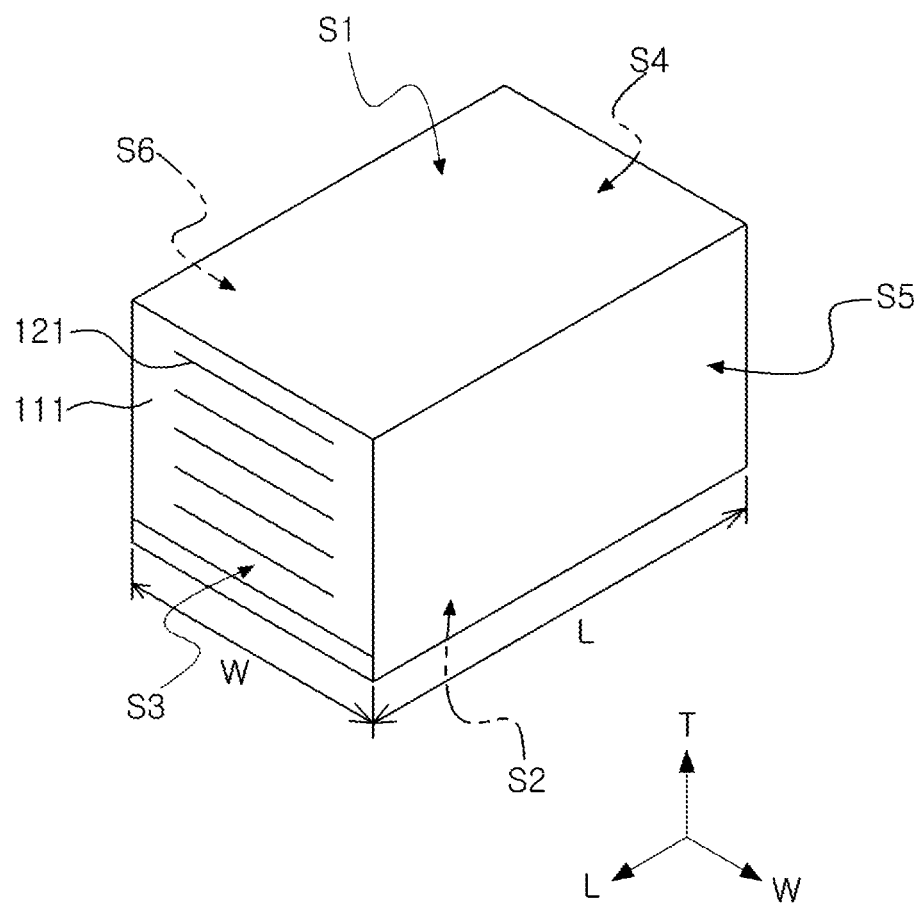
FIG. 2 is a schematic diagram illustrating a ceramic body according to an exemplary embodiment.

FIG. 2 is a schematic diagram illustrating a ceramic body according to an exemplary embodiment.

Figure 3:
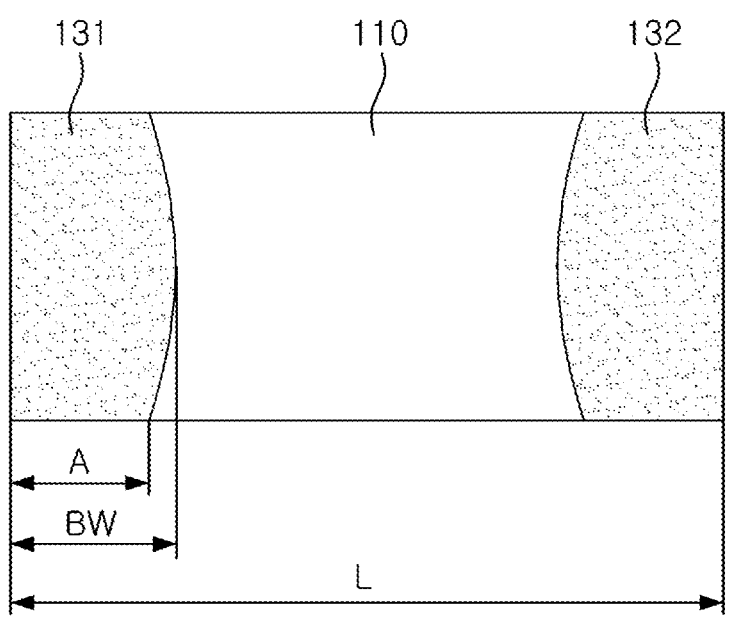
FIG. 3 is a planar view schematically illustrating the multilayer ceramic electronic component in a direction C of FIG. 1.

FIG. 3 is a planar view schematically illustrating the multilayer ceramic electronic component in a direction C of FIG. 1.

Figure 4:
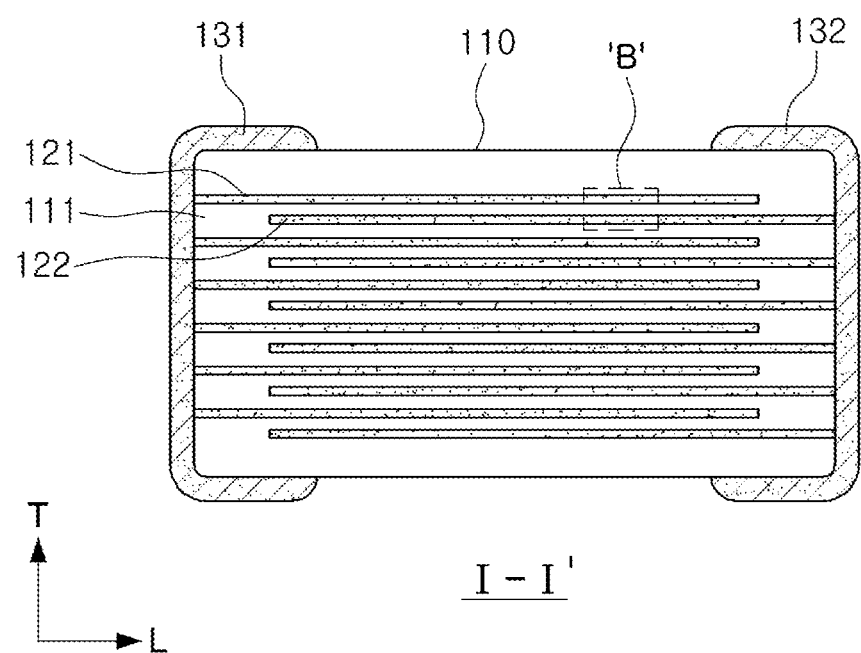
FIG. 4 is a cross-sectional view taken along line I-I' of FIG. 1.

FIG. 4 is a cross-sectional view taken along line I-I' of FIG. 1.

Based on FIGS. 1 to 4, a multilayer ceramic electronic component 100 according to an exemplary embodiment includes a ceramic body 110 including a dielectric layer 111 and a plurality of internal electrodes 121 and 122 disposed to oppose each other with the dielectric layer 111 interposed therebetween, and having first and second surfaces S1 and S2 opposing each other in a first direction, third and fourth surfaces S3 and S4 connected to the first and second surfaces S1 and S2 opposing each other in a second direction, and fifth and sixth surfaces S5 and S6 connected to the first to fourth surfaces and opposing each other in a third direction; and first and second external electrodes 131 and 132 disposed on the third and fourth surfaces S3 and S4 opposing each other in the second direction and electrically connected to the internal electrodes 121 and 122.

Hereinafter, a multilayer ceramic electronic component according to an exemplary embodiment in the present disclosure will be described. In particular, the multilayer ceramic electronic component will be described as a multilayer ceramic capacitor, but is not limited thereto.

In the multilayer ceramic capacitor according to an exemplary embodiment of the present disclosure, a "length direction" refers to an "L" direction, a "width direction" refers to a "W" direction, and a "thickness direction" refers to a "T" direction. Here, the "thickness direction" may be the same as a direction in which dielectric layers are stacked.

In an exemplary embodiment, a shape of the ceramic body 110 is not particularly limited but may be hexahedral as illustrated in the drawings.

The ceramic body 110 may include first and second surfaces S1 and S2 opposing each other in a first direction, third and fourth surfaces S3 and S4 connected to the first and second surfaces S1 and S2 opposing each other in a second direction, and fifth and sixth surfaces S5 and S6 connected to the first to fourth surfaces and opposing each other in a third direction.

The first and second surfaces S1 and S2 are surfaces opposing each other in the first direction, the thickness direction of the ceramic body 110. The third and fourth surfaces S3 and S4 can be defined as surfaces opposing each other in the second direction, the length direction, and the fifth and sixth surfaces S5 and S6 can be defined as surfaces opposing each other in the third direction, the width direction.

A plurality of the internal electrodes 121 and 122 formed in the ceramic body 110 may have ends exposed to the third and fourth surfaces S3 and S4 of the ceramic body.

The internal electrodes 121 and 122 may be a pair of first and internal electrodes 121 and 122 having different polarities from each other.

An end of the first internal electrode 121 may be exposed to the third surface S3, and an end of the second internal electrode 122 may be exposed to the fourth surface S4.

The other ends of the first and second internal electrodes 121 and 122 are formed in a certain distance from the fourth surface or the third surface S3. Details thereof will be described below.

The first and second external electrodes 131 and 132 are formed on the third and fourth surfaces S3 and S4 of the ceramic body to be electrically connected to the internal electrodes.

According to an exemplary embodiment, a raw material forming the dielectric layer 111 is not particularly limited as long as sufficient capacitance can be obtained; for example, a barium titanate-based material, a lead complex perovskite-based material, a strontium titanate-based material, or the like may be used.

The dielectric layers 111 may be formed by adding various ceramic additives, organic solvents, plasticizers, binders, dispersing agents, and the like to a powder such as a barium titanate ($BaTiO_3$) powder, or the like, according to an intended use.

The ceramic body 110 may include an active portion as a portion contributing to forming the capacitance of the capacitor and upper and lower cover portions formed on upper and lower surfaces of the active portion, respectively, as upper and lower margin portions.

The active portion may be formed by repeatedly stacking a plurality of the first and second internal electrodes 121 and 122 with the dielectric layers 111 interposed therebetween.

The upper and lower cover portions may have the same material and configuration as those of the dielectric layer 111 except that the internal electrodes are not included therein.

That is, the upper and lower cover portions may contain a ceramic material, for example, a barium titanate ($BaTiO_3$)-based ceramic material.

The upper and the lower cover portions may be formed by stacking a single dielectric layer or two or more dielectric layers on the upper and lower surfaces of the active portion in a vertical direction, respectively. The upper and the lower cover portions can basically serve to prevent damage of the internal electrodes due to physical or chemical stress.

A material for forming the first and second internal electrodes 121 and 122 is not particularly limited, but may be, for example, a conductive paste containing at least one of silver (Ag), lead (Pd), platinum (Pt), nickel (Ni) and copper (Cu).

The multilayer ceramic capacitor according to an exemplary embodiment may include the first external electrode 131 electrically connected to the first internal electrode 121 and the second external electrode 132 electrically connected to the second internal electrode 122.

The first and second external electrodes 131 and 132 may be electrically connected to the first and second internal electrodes 121 and 122 to generate capacitance, and the second external electrode 132 may be connected to a different potential form the first external electrode 131.

The first and second external electrodes 131 and 132 may be disposed respectively on the third and fourth surfaces S3 and S4 of the ceramic body 110 in the second direction, the length direction, and may extend to the first and second surfaces S1 and S2 in the first direction, the thickness direction.

Further, the first and second external electrodes 131 and 132 may extend to the fifth and sixth surfaces S5 and S6 of the ceramic body 110 in the third direction, the width direction.

The first and second external electrodes 131 and 132 may be formed of a conductive material the same as that of the internal electrodes, but are not limited thereto and may be formed of, for example, Cu, Ag, Ni, or the like.

The first and second external electrodes 131 and 132 may be formed by applying a conductive paste prepared by adding a glass frit to the metal powder and firing the same.

Based on FIG. 3, when a shortest distance from both end portions of the ceramic body 110 in the second direction to an end portion of the external electrodes 131 and 132 disposed on the first and second surfaces S1 and S2 of the ceramic body is denoted by "A" and a longest distance is denoted by "BW", the multilayer ceramic capacitor according to an exemplary embodiment satisfies $0.9 \leq A/BW < 1.0$.

By satisfying $0.9 \leq A/BW < 1.0$ when the shortest distance from both end portions of the ceramic body 110 in the second direction to an end portion of the external electrodes 131 and 132 disposed on the first and second surfaces S1 and S2 of the ceramic body is denoted by "A" and the longest distance is denoted by "BW", flexural strength can be improved, thereby improving reliability as well. A microscope may be used to measure the shortest distance A and the longest distance BW, although the present disclosure is not limited thereto.

The shortest distance A and the longest distance BW from both end portions of the ceramic body 110 in the second direction to an end portion of the external electrodes 131 and 132 disposed on the first and second surfaces S1 and S2 of the ceramic body may be generated because a paste for external electrode to from the external electrodes partially flows along the ceramic body 110 before being dried to form the external electrodes 131 and 132, resulting in formation of the external electrodes having an uneven shape.

The external electrodes may have various irregular shapes. For example, as illustrated in FIG. 3, the paste for external electrode may flow along an edge of the ceramic body 110 in the length direction.

The multilayered ceramic capacitor according to an exemplary embodiment is an electrical component, and in order to significantly improve flexural strength, a relational expression of $0.9 \leq A/BW < 1.0$ may be satisfied when the shortest distance from both end portions of the ceramic body 110 in the second direction to an end portion of the external electrodes 131 and 132 disposed on the first and second surfaces S1 and S2 of the ceramic body 110 is denoted by "A" and the longest distance is denoted by "BW".

When the ratio A/BW of the shortest distance A to the longest distance BW from both ends of the ceramic body 110 to an end of the external electrodes 131 and 132 is less than 0.9, an surface area to which flexural stress is applied is reduced, thereby reducing flexural strength.

Meanwhile, when the ratio A/BW is equal to 1.0, the external electrodes may have a shape on which the external electrode paste has not flowed, thereby maximizing the surface area to which the flexural stress is applied and ideally improving the flexural strength; however, this may not be easily achieved due to process characteristics.

A method of allowing the external electrodes to have a uniform shape according to an exemplary embodiment is not particularly limited. For example, an organic substance coating film which can be easily eliminated may be used such that the external electrode may have a uniform area by controlling the external electrodes to be significantly reduced in the formation of a non-uniform area.

The first and second external electrodes 131 and 132 may be formed by applying a conductive paste prepared by adding glass frit to the metal powder and then firing the same.

The above method allows the easily-removed organic substance coating film to be formed on the surface of the ceramic body 110 before the first and second external electrodes 131 and 132 are formed in the ceramic main body 110.

The organic substance coating film of the portion of the ceramic body 110, in which the first and second external electrodes 131 and 132 are formed, is then removed.

A conductive paste for external electrodes is applied to the surface of the ceramic body 110 to form the first and second external electrodes 131 and 132.

Lastly, the organic substance coating film is removed from the surface of the ceramic body 110, on which the first and second external electrodes 131 and 132 have been formed, thus removing up to a portion on which the conductive paste for external electrodes attached on the organic substance coating film flows.

The shortest distance A from both end portions of the ceramic body 110 in the second direction to an end portion of the external electrodes 131 and 132 disposed on the first and second surfaces S1 and S2 of the ceramic body 110 can be measured at an edge region of the ceramic body 110 in the third direction.

According to an exemplary embodiment, as the shape of the external electrodes 131 and 132 may have the shape in which the external electrodes 131 and 132 flow along an edge of the ceramic main body 110 in the length direction, the shortest distance A from both end portions of the ceramic body 110 in the second direction to an end portion of the external electrodes 131 and 132 disposed on the first and second surfaces S1 and S2 of the ceramic body 110 can be measured at an edge region of the ceramic body 110 in the third direction.

Meanwhile, the longest shortest distance BW from both end portions of the ceramic body 110 in the second direction to an end portion of the external electrodes 131 and 132 disposed on the first and second surfaces S1 and S2 of the ceramic body 110 can be measured in a center region of the ceramic body 110 in the third direction.

As described above, as the shape of the external electrodes 131 and 132 may have the shape in which the external electrodes 131 and 132 flow along an edge of the ceramic main body 110 in the length direction, the longest shortest distance BW from both end portions of the ceramic body 110 in the second direction to an end portion of the external electrodes 131 and 132 disposed on the first and second surfaces S1 and S2 of the ceramic body 110 can be measured in the center region of the ceramic body 110 in the third direction.

According to an exemplary embodiment, a ratio BW/L of the longest distance BW from both end portions of the ceramic body 110 in the second direction to an end portion of the external electrodes 131 and 132 disposed on the first and second surfaces S1 and S2 of the ceramic body 110 to a length L of the ceramic body 110 may satisfy 0.2≤BW/L≤0.3. The length L of the ceramic body 110 may be measured by a micrometer, although the present disclosure is not limited thereto.

By adjusting the ratio BW/L of the longest distance BW from both end portions of the ceramic body 110 in the second direction to an end portion of the external electrodes 131 and 132 disposed on the first and second surfaces S1 and S2 of the ceramic body 110 to a length L of the ceramic body 110 to satisfy 0.2≤BW/L≤0.3, the flexural strength can be improved while restraining arc generation.

The arc generation refers to an arc generated under a high voltage ranging from 1 KV to 5 KV due to a field concentration when the external electrodes are closely disposed to each other, which serves to reduce reliability of a multilayer ceramic electronic component.

According to an exemplary embodiment, flexural strength and reliability can be improved by adjusting the ratio BW/L of the longest distance BW from both end portions of the ceramic body 110 in the second direction to an end portion of the external electrodes 131 and 132 disposed on the first and second surfaces S1 and S2 of the ceramic body 110 to a length L of the ceramic body 110.

When the ratio BW/L of the longest distance BW from both end portions of the ceramic body 110 in the second direction to an end portion of the external electrodes 131 and 132 disposed on the first and second surfaces S1 and S2 of the ceramic body 110 to a length L of the ceramic body 110 is greater 0.3, an arc may be generated due to a field concentration. When the ratio is less than 0.2, a plating solution may penetrate into the ceramic body, or an adhesive strength of the external electrodes may decrease, thereby causing the flexural strength to be reduced.

An additional plating layer may be disposed in an upper portion of the external electrodes 131 and 132, and the plating layer may be in the form in which nickel (Ni) and tin (Sn) plating layers are arranged in order.

Figure 5:
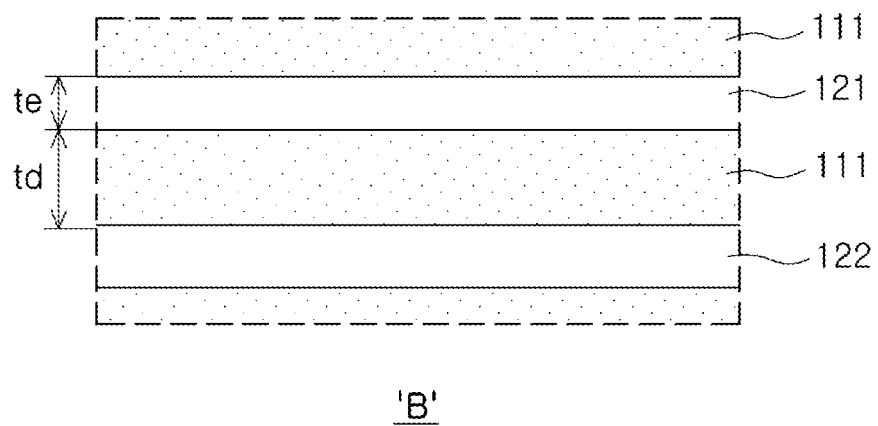
FIG. 5 is an enlarged view of region "B" of FIG. 4.

FIG. 5 is an enlarged view of region "B" of FIG. 4.

Based on FIG. 5, as for the multilayer ceramic electronic component according to an exemplary embodiment, the thickness td of the dielectric layer 111 and the thickness te of the internal electrodes 121 and 122 may satisfy td>2×te.

That is, according to an exemplary embodiment, the thickness td of the dielectric layer 111 is twice larger than the thickness te of the internal electrodes 121 and 122.

Generally, a high voltage electrical component involves a critical reliability issue according to reduction of dielectric breakdown voltage in a high voltage environment.

A multilayer ceramic capacitor according to an exemplary embodiment has the thickness td of the dielectric layer 111 twice as large as the thickness te of the internal electrodes 121 and 122 to prevent the dielectric breakdown voltage from being reduced in a high voltage environment. This will lead to improved breakage voltage characteristics by increasing the thickness of the dielectric layer, which is a distance between the internal electrodes.

When the thickness td of the dielectric layer 111 is less than or equal to twice the thickness te of the internal electrodes 121 and 122, the thickness of the dielectric layer 111, which is a distance between the internal electrodes 121 and 122, is thin, and the dielectric breakdown voltage may decrease.

The thickness te of the internal electrodes 121 and 122 is less than 1 μm, and the thickness td of the dielectric layer 111 is less than 2.8 μm, but are not limited thereto. The thickness td of the dielectric layer 111 may refer to an average thickness of the dielectric layer 111 disposed between the first and second internal electrodes 121 and 122. The thickness te of each of the internal electrodes 121 and 122 may refer to an average thickness of the internal electrodes 121 and 122. Each of the thickness td and the thickness te may be measured by using a scanning electron microscope (SEM) by scanning a cross-section of the body 110 in a length-thickness plane, although the measurement is not limited thereto.

Hereinbelow, a method for manufacturing a multilayer ceramic capacitor according to an exemplary embodiment will be described, but is not limited thereto.

A method for manufacturing a multilayer ceramic capacitor according to an exemplary embodiment involves applying a slurry formed to contain a powder such as a $BaTiO_3$ powder, or the like, to a carrier film and drying the same to prepare a plurality of ceramic green sheets, thus forming dielectric layers.

The ceramic green sheets is manufactured by preparing a slurry by mixing a ceramic powder, a binder and a solvent and manufacturing the slurry as a sheet form having a several μm-thickness using a doctor blade method.

A conductive paste for internal electrodes was prepared to contain 40 parts by weight to 50 parts by weight of nickel particles having an average particle size of 0.1 μm to 0.2 μm.

The conductive paste for internal electrodes was applied to the green sheets using a screen-printing method to form internal electrodes, and the green sheets, on which internal electrode patterns are disposed, were stacked to form a ceramic body 110.

Subsequently, an external electrode containing a glass and at least one conductive metal selected from the group consisting of copper (Cu), silver (Ag), nickel (Ni) and alloys thereof may be formed on an external side of the ceramic body. In one example, hydrophobic plasma may be applied to the ceramic body as a pretreatment, such that the longest distance BW may become relative even, with respect to another portion of the external electrode. As such, 0.9≤A/BW<1.0 may be satisfied.

Although the glass is not particularly limited, a material having a composition the same as that of the glass used in manufacturing of the external electrode of a general multilayer ceramic capacitor may be used.

The external electrodes, by being formed on the upper and lower surfaces and at the end portion of the ceramic body, can be electrically connected to the first and second internal electrodes.

The electrode layers may contain at least 5 vol % of the glass based on the conductive metal.

To measure frequency of flexural crack occurrence, samples of the multilayer ceramic capacitor were mounted on a substrate, and a distance from a central portion pressed by bending was set to 6 mm and were observed whether the flexural strength is guaranteed.

The multilayer ceramic capacitor was manufactured to have a 3225 size (length×width, 3.2 mm×2.5 mm).

TABLE 1

| Sample | BW (mm) | A (mm) | A/BW | No. of 6 mm flexural strength defects |
|---|---|---|---|---|
| 1 | 0.75 | 0.72 | 0.96 | 0/20 |
| 2 | 0.75 | 0.71 | 0.95 | 0/20 |
| 3 | 0.75 | 0.70 | 0.93 | 0/20 |
| 4 | 0.75 | 0.69 | 0.92 | 0/20 |
| 5 | 0.75 | 0.68 | 0.91 | 0/20 |
| *6 | 0.75 | 0.67 | 0.89 | 1/20 |
| *7 | 0.75 | 0.66 | 0.88 | 1/20 |
| *8 | 0.75 | 0.65 | 0.87 | 2/20 |
| *9 | 0.75 | 0.63 | 0.84 | 4/20 |
| *10 | 0.75 | 0.60 | 0.80 | 3/20 |
| *11 | 0.75 | 0.57 | 0.76 | 5/20 |
| *12 | 0.75 | 0.55 | 0.73 | 7/20 |
| *13 | 0.75 | 0.50 | 0.67 | 7/20 |

*comparative examples

With reference to Table 1 above, it is understood that Samples 1 to 5, having the ratio A/BW of the shortest distance A to the longest distance BW from both ends of the ceramic body 110 to an end of the external electrodes 131 and 132 satisfying the range of 0.9≤A/BW<1.0, satisfy the flexural strength characteristics at the distance of 6 mm.

In contrast, Samples 6 to 13, comparative examples and beyond said range of the present disclosure, do not satisfy the flexural strength characteristics at the distance of 6 mm.

As described above, a multilayer ceramic electronic component according to an exemplary embodiment may have improved flexural strength and thus improved reliability by adjusting a ratio of a longest distance to a shortest distance from both ends of a ceramic body to an end of an external electrode.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body comprising a dielectric layer and a plurality of internal electrodes disposed to oppose each other with the dielectric layer interposed therebetween, and having first and second surfaces opposing each other in a first direction, third and fourth surfaces connected to the first and second surfaces opposing each other in a second direction, and fifth and sixth surfaces connected to the first to fourth surfaces and opposing each other in a third direction; and
an external electrode disposed on one of the third and fourth surfaces and connected to one or more of the plurality of internal electrodes,
wherein the external electrode extends onto the first and second surfaces of the ceramic body, and
0.9≤A/BW<1.0 and 0.68 mm≤A≤0.72 mm are satisfied, where a shortest distance, in the second direction, from an end portion of the ceramic body which the external electrode is disposed at to an end portion of the external electrode disposed on one of the first and second surfaces of the ceramic body, is denoted by "A", and a longest distance, in the second direction, from the end portion of the ceramic body which the external electrode is disposed at to the end portion of the external electrode disposed on the one of the first and second surfaces of the ceramic body, is denoted by "BW".

2. The multilayer ceramic electronic component of claim 1, wherein the shortest distance A is measured at an edge region of the ceramic body in the third direction.

3. The multilayer ceramic electronic component of claim 1, wherein the longest distance BW is measured at a center region of the ceramic body in the third direction.

4. The multilayer ceramic electronic component of claim 1, wherein a ratio BW/L satisfies 0.2≤BW/L≤0.3, where L is a length of the ceramic body.

5. The multilayer ceramic electronic component of claim 1, wherein a thickness te of one of the internal electrodes is less than 1 μm.

6. The multilayer ceramic electronic component of claim 1, wherein a thickness td of the dielectric layer is less than 2.8 μm.

7. The multilayer ceramic electronic component of claim 6, wherein the thickness td of the dielectric layer and a thickness te of one of the internal electrodes satisfies td>2× te.

8. A multilayer ceramic electronic component comprising:
a ceramic body comprising a dielectric layer and a plurality of internal electrodes disposed to oppose each other with the dielectric layer interposed therebetween, and having first and second surfaces opposing each other in a first direction, third and fourth surfaces connected to the first and second surfaces opposing each other in a second direction, and fifth and sixth surfaces connected to the first to fourth surfaces and opposing each other in a third direction; and
an external electrode disposed on one of the third and fourth surfaces and connected to one or more of the plurality of internal electrodes,
wherein the external electrode extends onto the first and second surfaces of the ceramic body,
a ratio BW/L satisfies 0.2≤BW/L≤0.3, where a longest distance, in the second direction, from an end portion of the ceramic body which the external electrode is disposed at to an end portion of the external electrode disposed on one of the first and second surfaces of the ceramic body, is denoted by "BW", and a length of the ceramic body is denoted by "L",
a length, in the second direction, of a center portion of an extension portion of the external electrode on the one of the first and second surfaces, is less than a length, in the second direction, of an edge portion of the extension portion of the external electrode on the one of the first and second surfaces, and
the multilayer ceramic capacitor has a 3225 size.

9. The multilayer ceramic electronic component of claim 8, wherein the longest distance BW is the length, in the second direction, of the center portion of the extension portion of the external electrode on the one of the first and second surfaces.

10. The multilayer ceramic electronic component of claim 8, wherein a thickness te of one of the internal electrodes is less than 1 μm.

11. The multilayer ceramic electronic component of claim 10, wherein a thickness td of the dielectric layer is less than 2.8 μm.

12. The multilayer ceramic electronic component of claim 11, wherein the thickness td of the dielectric layer and a thickness te of one of the internal electrodes satisfies td>2× te.

13. A multilayer ceramic electronic component comprising:
a ceramic body comprising a dielectric layer and a plurality of internal electrodes disposed to oppose each other with the dielectric layer interposed therebetween, and having first and second surfaces opposing each other in a first direction, third and fourth surfaces connected to the first and second surfaces opposing each other in a second direction, and fifth and sixth surfaces connected to the first to fourth surfaces and opposing each other in a third direction; and an external electrode disposed on one of the third and fourth surfaces and connected to one of more of the plurality of internal electrodes, wherein the external electrode extends onto the first and second surfaces of the ceramic body, a relational expression of $0.9 \leq A/BW < 1.0$ and $0.68 \text{ mm} \leq A \leq 0.72 \text{ mm}$ are satisfied, where a shortest distance, in the second direction, from an end portion of the ceramic body which the external electrode is disposed at to an end portion of the external electrode disposed on one of the first and second surfaces of the ceramic body, is denoted by "A", and a longest distance, in the second direction, from the end portion of the ceramic body which the external electrode is disposed at to the end portion of the external electrode disposed on the one of the first and second surfaces of the ceramic body, is denoted by "BW", the shortest distance A is measured at an edge region of the ceramic body in the third direction, and the longest distance BW is measured at a center region of the ceramic body in the third direction, and the thickness td of the dielectric layer and a thickness te of each of the internal electrodes satisfies $td > 2 \times te$.

14. The multilayer ceramic electronic component of claim 13, wherein a ratio BW/L satisfies $0.2 \leq BW/L \leq 0.3$, where L is a length of the ceramic body.

15. The multilayer ceramic electronic component of claim 13, wherein a thickness te of one of the internal electrodes is less than 1 μm.

16. The multilayer ceramic electronic component of claim 13, wherein a thickness td of the dielectric layer is less than 2.8 μm.

17. The multilayer ceramic electronic component of claim 13, wherein the multilayer ceramic capacitor has a 3225 size, a thickness te of one of the internal electrodes is less than 1 μm, and a thickness td of the dielectric layer is less than 2.8 μm.

18. The multilayer ceramic electronic component of claim 1, wherein a thickness te of one of the internal electrodes is less than 1 μm, and a thickness td of the dielectric layer is less than 2.8 μm.

19. The multilayer ceramic electronic component of claim 18, wherein a ratio BW/L satisfies $0.2 \leq BW/L \leq 0.3$, where L is a length of the ceramic body.

20. The multilayer ceramic electronic component of claim 1, wherein the multilayer ceramic capacitor has a 3225 size.

* * * * *